(12) United States Patent
Matthews

(10) Patent No.: US 8,731,826 B2
(45) Date of Patent: May 20, 2014

(54) AUTOMATIC DETERMINATION OF TIRE HEIGHT FOR IMPROVING GUIDANCE PERFORMANCE

(75) Inventor: Paul Matthews, Bel Aire, KS (US)

(73) Assignee: AGCO Cor[poration, Duluth, GA (US)

( * ) Notice: Subject to any disclaimer, the term of this patent is extended or adjusted under 35 U.S.C. 154(b) by 0 days.

(21) Appl. No.: 13/311,011

(22) Filed: Dec. 5, 2011

(65) Prior Publication Data

US 2012/0150439 A1 Jun. 14, 2012

Related U.S. Application Data

(60) Provisional application No. 61/419,916, filed on Dec. 6, 2010.

(51) Int. Cl.
*G01S 19/42* (2010.01)
(52) U.S. Cl.
USPC ........ 701/469; 701/1; 701/2; 701/23; 701/25; 340/443; 340/438; 340/440
(58) Field of Classification Search
USPC ......... 701/469, 470, 468, 471, 473, 448, 445, 701/444, 442, 417, 412, 411, 32.4, 32.3, 701/495, 496, 504, 514, 518, 534, 214, 215, 701/223, 224, 532, 50, 1, 2, 23, 24, 25, 300, 701/301; 342/357.36, 357.29, 357.27, 342/357.44, 357.52, 357.57; 340/443, 438, 340/440, 901, 928, 992, 995.13
See application file for complete search history.

(56) References Cited

U.S. PATENT DOCUMENTS

| 6,236,916 | B1 | | 5/2001 | Staub | |
|---|---|---|---|---|---|
| 6,282,479 | B1 | * | 8/2001 | Ghoneim et al. | 701/70 |
| 6,438,464 | B1 | * | 8/2002 | Woywod et al. | 701/1 |
| 7,263,422 | B2 | * | 8/2007 | Lange et al. | 701/50 |
| 8,265,826 | B2 | * | 9/2012 | Feller et al. | 701/41 |
| 2002/0057217 | A1 | * | 5/2002 | Milnes et al. | 342/357.07 |
| 2004/0049336 | A1 | * | 3/2004 | Knockeart et al. | 701/201 |
| 2004/0225423 | A1 | * | 11/2004 | Carlson et al. | 701/36 |
| 2006/0064240 | A1 | * | 3/2006 | Wurth | 701/201 |
| 2008/0086249 | A1 | * | 4/2008 | Lange | 701/41 |
| 2008/0147280 | A1 | * | 6/2008 | Breed | 701/46 |
| 2008/0167770 | A1 | * | 7/2008 | Macdonald et al. | 701/24 |
| 2008/0269988 | A1 | * | 10/2008 | Feller et al. | 701/41 |
| 2011/0022267 | A1 | * | 1/2011 | Murphy | 701/38 |

FOREIGN PATENT DOCUMENTS

| EP | 1475609 A2 | 11/2004 |
|---|---|---|
| JP | 9304066 A | 11/1997 |

OTHER PUBLICATIONS

International Search Report for PCT/US20111063363 dated Apr. 24, 2012.

* cited by examiner

*Primary Examiner* — Tuan C. To
*Assistant Examiner* — Jelani Smith

(57) ABSTRACT

A system and method improve guidance system performance. An accuracy improvement module (AIM) can be configured to compare observed and expected inclination compensation factors (ICFs) at a plurality of inclination angles to detect an inaccuracy in antenna height. In response to detecting an inaccuracy, an AIM can determine a revised antenna height that more accurately represents the height of an antenna above ground. A proposed antenna height can be determined using an observed ICF. A fixed vehicle body height can be subtracted from the proposed antenna height to provide a proposed tire radius. The proposed tire radius can be compared to a table of standard tire radii to determine a tire radius value, which can then be added to the fixed vehicle body height to provide a revised antenna height. The revised antenna height can improve the accuracy or calculated ground positions, thereby improving guidance system performance.

5 Claims, 7 Drawing Sheets

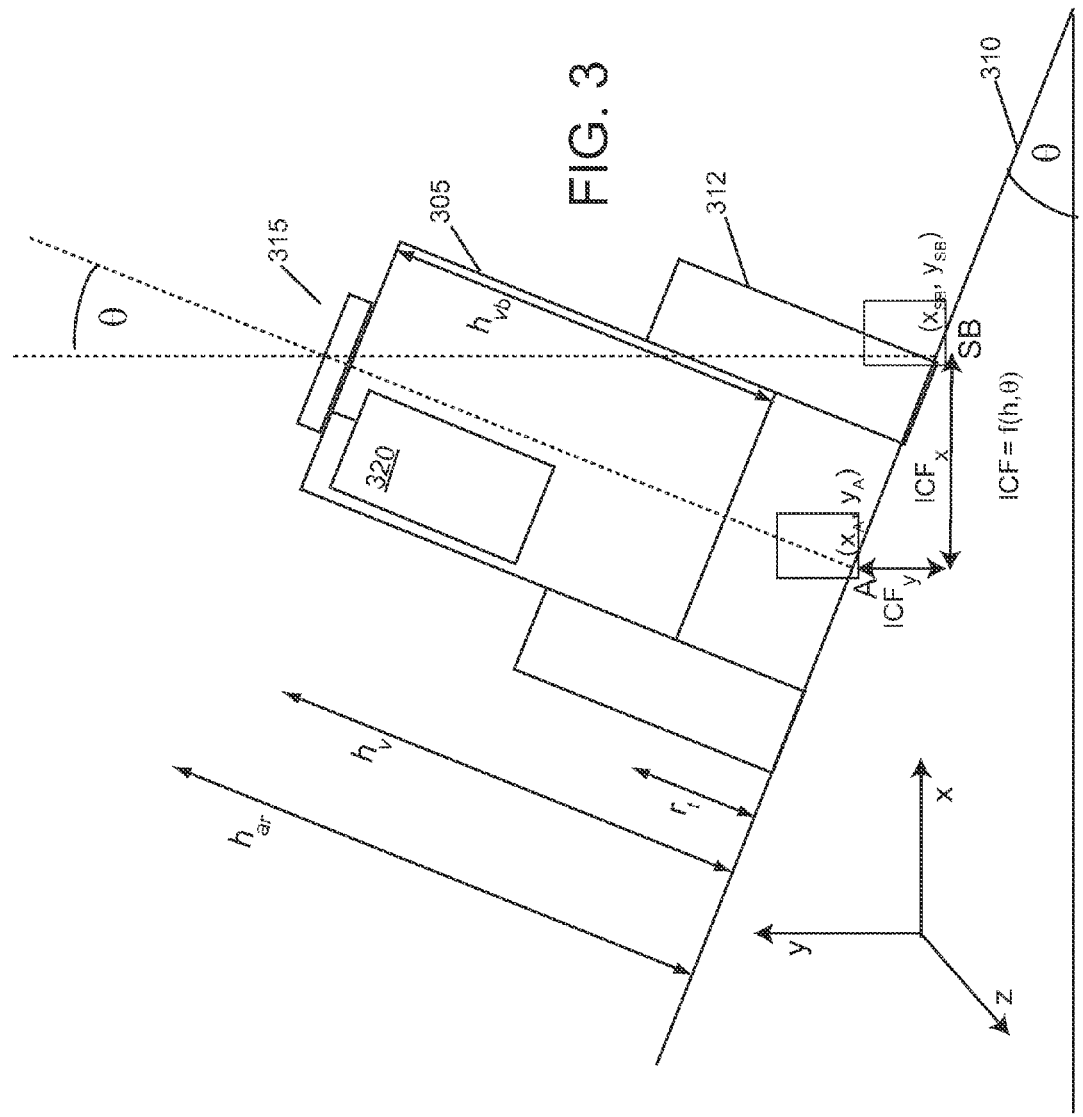

AUTOMATIC DETERMINATION OF TIRE HEIGHT FOR IMPROVING GUIDANCE PERFORMANCE

CROSS-REFERENCE TO RELATED APPLICATIONS

This application claims the benefit of U.S. Provisional Application Ser. No. 61/419,916, filed Dec. 6, 2010, and entitled "Automatic Determination of Tire Height For Improving Guidance Performance", which is entirely incorporated by reference herein.

FIELD OF THE INVENTION

This invention pertains generally to agricultural vehicle navigation, and more particularly to methods to improve guidance system performance by addressing inaccuracies in the calculation of an inclination compensation factor.

BACKGROUND

Global competition compels farmers to modify cultivation practices by exercising more cost-effective farming techniques and acquiring more efficient machinery. In doing so, farmers have turned to larger machinery as well as sophisticated technology that automates and optimizes the operation of agricultural vehicles and towed implements. As farming becomes increasingly mechanized, and farm implements faster and larger, accurate positioning of equipment becomes a more significant factor in operational efficiency.

Automatic steering of a main vehicle e.g., a tractor and its towed implement, is often used on large farms where high value crops are grown and operators are not well trained in driving. Many vehicle guidance systems rely on steering inputs from Global Positioning System (GPS), Global Navigation Satellite System (GNSS), or similar satellite navigation systems. As known in the art, signals from a plurality of satellites can be used to calculate a geographical position of a vehicle. While an effective means of providing accurate location data when a vehicle is moving on fairly level terrain, position data derived from satellite signals may not accurately represent actual ground position when the vehicle is operated on a sloped surface. Inertial sensors are often employed to detect one or more inclination angles of a vehicle. The detected inclination angle can be used to determine an inclination compensation factor (ICF) that represents the effects of vehicle inclination on ground position determination. The satellite-based position and the ICF can be used to provide an adjusted position that compensates for ground slope and better represents the actual vehicle ground track. In general, ICF computations are based on vehicle's inclination angle(s), such as a roll angle, and the height above ground of the antenna receiving the satellite transmissions. Because antennas are typically deployed on the top of a vehicle for optimum satellite reception, the vehicle height is generally be used to represent antenna height. However, vehicle height, and consequently antenna height, can fluctuate with tire height, and differences in antenna height due to varying tire heights can lead to measurable differences in ICF's, resulting in differences in the adjusted positions. Current methods allow the manual configuration of such height parameters; however a change in tire height is not readily associable with steering performance, and thus not reconfigured to a correct value. As a result, the methods can be plagued by errors that can adversely affect guidance system performance, particularly those systems that use real-time kinematic (RTK) techniques that are sensitive to accuracy.

BRIEF DESCRIPTION OF THE DRAWINGS

FIG. 3 depicts an example embodiment of the invention.

OVERVIEW

Figure 1:
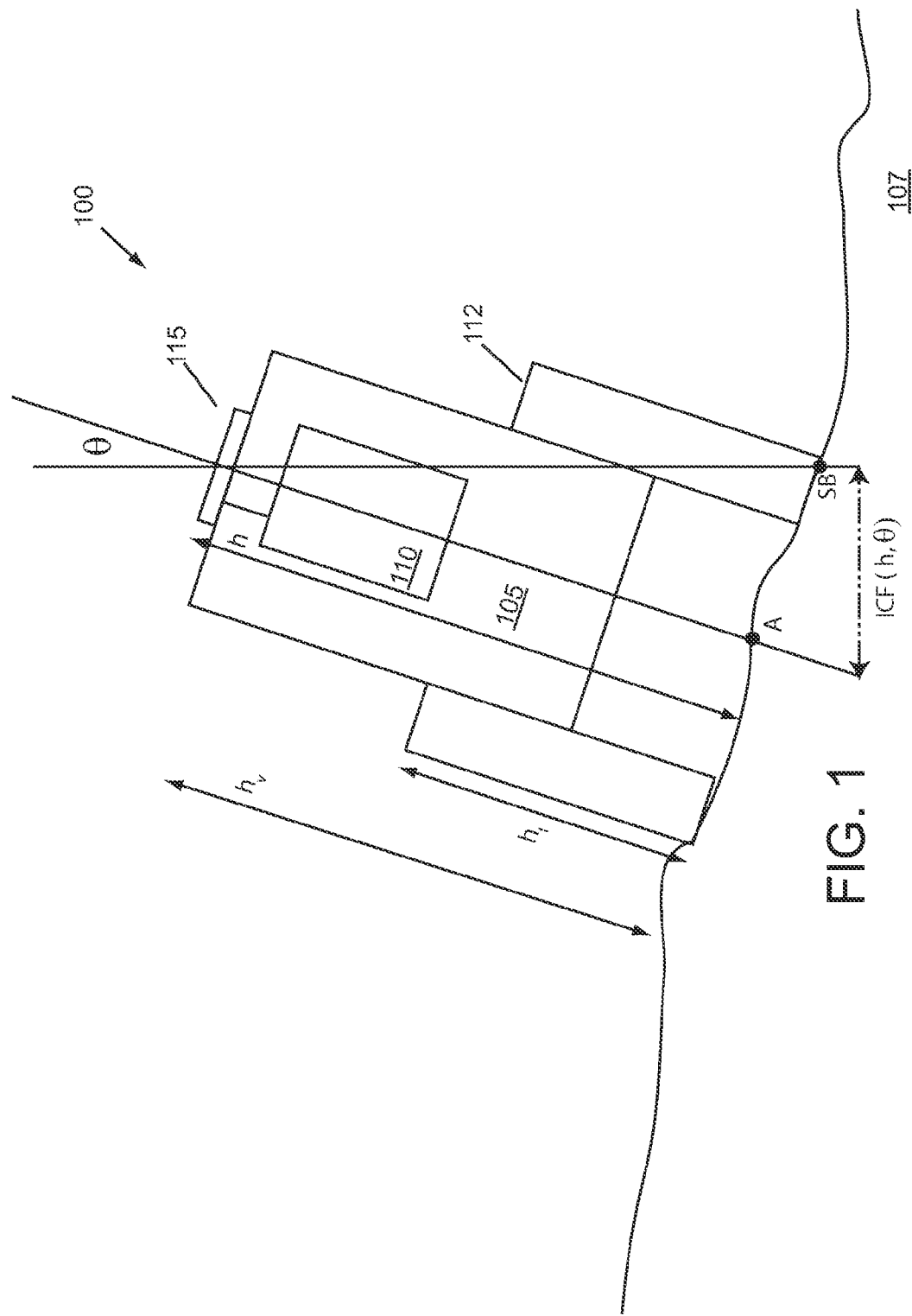
FIG. 1 depicts an example embodiment in which a vehicle navigation system (VNS) is installed on an agricultural vehicle.

The present invention can improve vehicle guidance system performance and the accuracy of data used in tracking operations. GNSS-based guidance systems have made great strides at automating at least the driving aspects of farming operations, but like many systems they have aspects that can be manually configured. Errors in configuration can lead to poorer performance. The present invention can detect a manual variable, the height of an antenna, and if incorrect, correct it. An example system of the invention includes a receiver for receiving satellite transmissions and providing a satellite-based position, an inertial sensor for detecting an inclination angle of a vehicle on which said receiver is deployed, and an accuracy improvement module (AIM) for detecting an error in the inclination compensation factor (ICF) associated with an inclination angle and in response determining a revised antenna height that more accurately represents the distance between the antenna and the ground. In an exemplary embodiment, an AIM is configured to determine a tire radius value for a vehicle's tire automatically. The tire radius value and a vehicle body height can be used to determine the revised antenna height for an antenna deployed atop the vehicle. By providing a more accurate antenna height value, an AIM can improve the accuracy of ICF calculations and ground position determinations, facilitating improved guidance system performance. This is particularly advantageous for agricultural vehicles that track and record traversed paths in order to efficiently apply crop products.

An example method of the invention comprises: receiving an observed ICF at an inclination angle, comparing the observed ICF to an expected ICF at the inclination angle, and in response to detecting an inaccuracy in the expected ICF, determining a revised antenna height. For example, in an exemplary method, an expected inclination compensation factor (ICF) based on a predetermined vehicle height can be compared to an observed ICF at a plurality of inclination angles to detect an inaccuracy in the expected ICF. An inaccuracy in the expected ICF can be caused by an inaccuracy in the antenna height used to determine the expected ICF. Typically antenna height is represented by vehicle height so that errors in antenna height are caused by inaccuracies in the vehicle height used to represent the antenna height. Because a vehicle body height is fixed, errors in vehicle height can be due to tire height, which can vary with the size and inflation of the tires installed on the vehicle. Using a plurality of observed ICFs at a plurality of inclination angles, a proposed antenna height can be provided. A vehicle body height can be subtracted from the proposed antenna height to provide a proposed tire radius. In an exemplary embodiment, the proposed tire radius can be compared to a table of standard tire radii in order to determine a tire radius value which can be added to the vehicle body height to provide a revised antenna height.

As a further example, a proposed tire radius can be doubled to provide a proposed tire height. The proposed tire height can be compared to a list of predetermined or standard tire heights, and rounded to the nearest standard tire height. The selected standard tire height can be halved to provide a tire radius value which can be added to the predetermined vehicle body height to provide a revised antenna height. The revised antenna height can be used to improve ICF computations, ground position determinations and guidance system performance.

An example apparatus of the invention can comprise an error detection module configured to detect an inaccuracy in an expected ICF, a height determination module for determining a height value, and a storage device for storing data. In an example embodiment, an apparatus of the invention can comprise a computer readable medium containing program instructions, comprising: computer readable code for computer readable code for receiving an expected ICF for an antenna mounted on a vehicle oriented at an inclination angle; computer readable code for receiving an observed ICF at said inclination angle; computer readable code for detecting an inaccuracy in said expected ICF; and computer readable code for determining a revised antenna height in response to detecting said inaccuracy in said expected ICF.

DETAILED DESCRIPTION OF EXAMPLE EMBODIMENTS

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of an agricultural vehicle, it will be understood that the present invention is not limited to that particular arrangement.

Referring now to the figures, wherein like reference numerals represent like parts throughout the several views, the present invention will be described in detail. FIG. 1 depicts an example 100 in which an agricultural vehicle 105 navigates terrain 107 which can include a ground surface sloped at varying angles. A GPS receiver can determine a satellite-based position point SB, projected directly below the antenna 115. From the satellite-based position SB, an inclination compensation factor (ICF) can be calculated to determine the ground position, or adjusted position represented by point A, projected along a vertical axis of the vehicle 105. As shown in FIG. 1, an ICF can be expressed as a function ICF(h, θ), where h is the height above ground of the body for which the ICF is being determined, and θ is the inclination angle of the vehicle 105. Typically a predetermined vehicle height, $h_v$, was used as a value for an antenna height. However, the vehicle height $h_v$, may not accurately reflect the height of the antenna, resulting in inaccurate ICF calculations that cause inaccurate determinations of the ground position point A. Because the length, or height, of the vehicle body is fixed, the difference between the predetermined vehicle height antenna heights can often be attributed to the vehicle's tires, the height of which is represented by $h_t$ in FIG. 1.

The vehicle 105 is equipped with a vehicle navigation system (VNS) 110 configured to receive satellite transmissions via the antenna 115 positioned atop the vehicle 105, and determine vehicle 105 position therefrom. In an exemplary embodiment, the VNS 110 is configured to detect inaccuracies in ICF's used to determine ground position when the vehicle is oriented at one or more inclination angles. Since inaccurate ICF's can be due to incorrect value for antenna height, the VNS 110 can be configured to provide a more accurate representation the height of the antenna 115 above ground. In an exemplary embodiment, the VNS 110 is configured to determine a tire radius value which can be added to a predetermined vehicle body height to provide a value for the height of the antenna 115 above ground. This value can be used to improve ICF calculation accuracy, thereby improving vehicle guidance system performance.

Figure 2A:
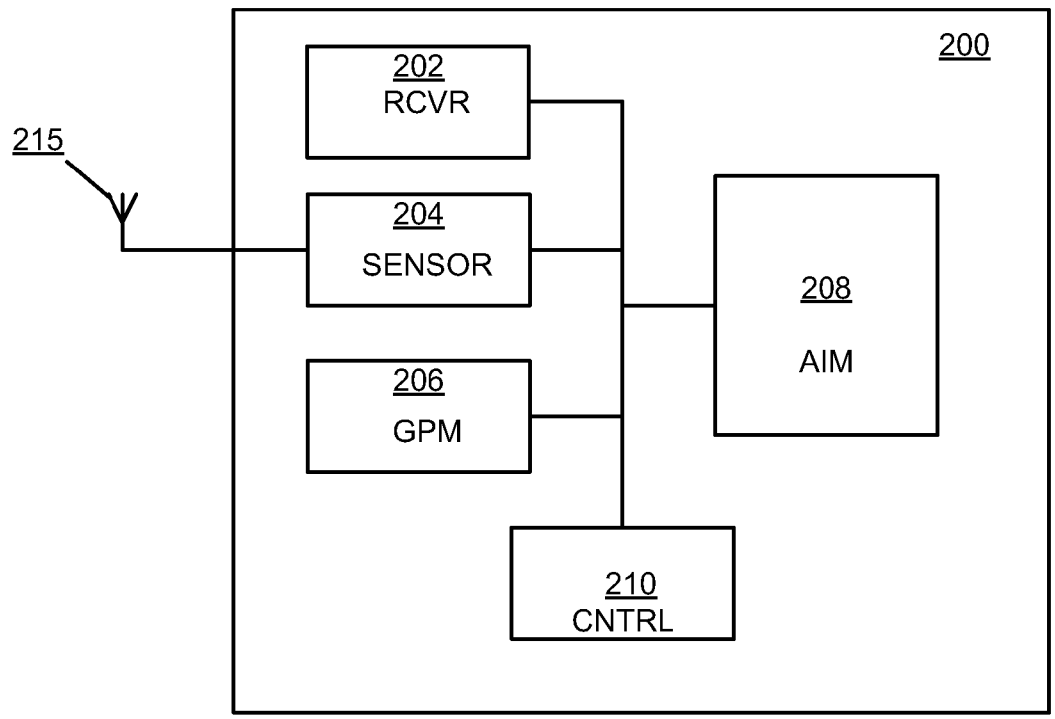
FIG. 2A depicts an example system of the invention.

FIG. 2A depicts an example VNS 200. The example system 200 includes a receiver 202 for receiving satellite transmissions via the antenna 215 and providing a satellite-based position for a vehicle, at least one inertial sensor 204 for detecting an inclination angle of a vehicle, a ground position module (GPM) 206 for providing a ground position from the satellite-based position that is adjusted to compensate for vehicle inclination; an accuracy improvement module (AIM) 208 for detecting and responding to inaccuracies in ground position determinations; and a controller 210 for controlling and implementing the various VNS 200 components and operations.

The receiver 202 can be a receiver such as any of those commonly employed in Global Positioning Satellite (GPS) or Global Navigation System Satellite (GNSS) systems. The receiver 202 can be configured to receive satellite transmissions via the antenna 115. In an example embodiment, the receiver 202 receives signals generated by at least three satellites. The receiver 202 can be configured with a processing means for executing algorithms known in the art for calculating a geographical position, hereafter referred to as a satellite-based position. While technically a position for the antenna 115, or the receiver 202 coupled to the antenna 115, the satellite-based position is also considered a position for the platform upon which the antenna and/or receiver are deployed. As a result, the satellite-based position calculated by the receiver 202 can be considered a satellite-based position for the vehicle 105. The receiver 202 can also be configured to provide an observed ICF for one or more inclination angles.

When employed in the context of agricultural vehicles, particularly when guidance systems record the paths traversed by the vehicles, it is desired that the ground position represent a point that lies within the footprint of the vehicle, preferably a point at or near the center of the footprint. When the vehicle 105 is traveling across a fairly level field or roadway, the satellite-based position generally lies within the vehicle footprint and is a fairly accurate representation of the vehicle's ground position since a vehicle's vertical axis is essentially perpendicular to the ground.

However, as depicted in FIG. 1, a field traversed by the agricultural vehicle 105 can include sloped areas. For sufficiently large slopes, the satellite-based position provided by the receiver may not be centered, or even located, within the vehicle footprint. Accordingly, it is a common practice to equip a vehicle with one or more inertial sensors 204 that can detect the inclination angle of the vehicle caused by a sloped surface. The inertial sensor 204 can be in the form of an accelerometer, gyroscope or any means configured to measure vehicle inclination angle. It is contemplated that the vehicle 105 can be equipped with a plurality of sensors that can be configured to measure inclination angles about various axes. For example, the vehicle 105 can be equipped with inertial sensors that can detect a roll angle, a pitch angle, and a tilt angle as known in the art.

The example system 200 includes a ground position module (GPM) 206 for determining a ground position adjusted for inclination angle. In an exemplary embodiment, the GPM 206 receives a satellite-based position from the receiver 202, as well as sensor data from one or more sensors 204. The GPM 206 can be configured to use a predetermined vehicle height $h_v$ stored at the time of manufacture in its ground position determinations. The GPM 206 can be configured to use the predetermined vehicle height $h_v$ and sensor 204 data to calculate an ICF associated with the detected inclination angle. For example, the GPM 206 can perform trigonometric operations as known in the art using height and inclination angle to determine an ICF associated with a particular inclination angle. The ICF can be combined with the satellite-based position to provide a ground position adjusted for inclination angle, hereinafter referred to as an adjusted position. The GPM 206 can be configured to receive a height value provided by the AIM 208 to provide an adjusted position.

The GPM 206 can be embodied in a variety of forms, including, but not limited to, a module comprising hardware, software, firmware, or some combination thereof. In an example embodiment, the GPM 206 can be embodied as stand-alone special purpose processor, or as a software module executed at the controller 210 or other processor/computing device. In an exemplary embodiment, the GPM 206 can be part of a vehicle's guidance system or cooperate with it. It is contemplated that in an example embodiment, operations discussed herein as performed separately at the receiver 202 or GPM 206 can be combined or implemented by other modules or means in the practice of the invention.

The AIM 208 is configured to improve guidance system performance by detecting and addressing inaccuracies in the expected ICFs used to provide adjusted positions. The AIM 208 can compare an expected ICF with an observed ICF and detect inaccuracies in the expected ICF provided by the GPM 206. As discussed previously herein, an ICF is a function of height and inclination angle. In general, a predetermined vehicle height $h_v$ is used to represent antenna height in the calculation of an expected ICF for a particular inclination angle. In response to a determination that an expected ICF is inaccurate, the AIM 208 can provide a revised antenna height to improve ICF calculations and guidance system performance.

Figure 2B:
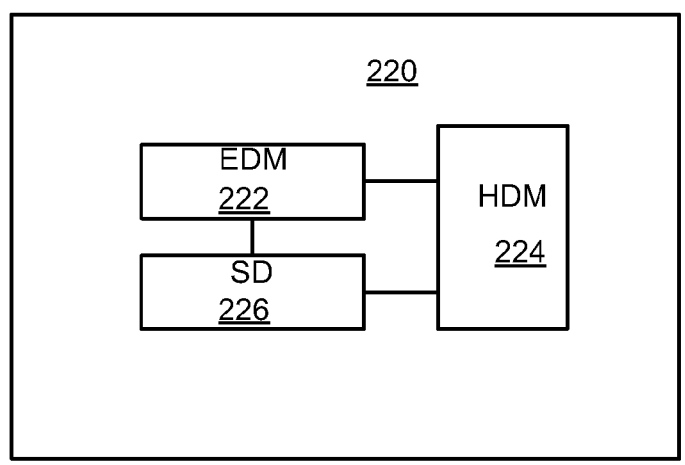
FIG. 2B depicts an example system of the invention

FIG. 2B depicts an example embodiment 220 of an AIM. The AIM 220 includes an error detection module (EDM) 222 for detecting inaccuracies in the expected ICF, a height determination module (HDM) 224 for determining a height value, and a storage device SD 224 for storing data. The EDM 222 can be configured to compare the expected ICF provided by the GPM 206 with the ICF measured by the receiver 202 at a plurality and variety of inclination angles. For greater inclination angles, an error in expected ICF determination can be manifested by a greater difference between an expected ICF and an observed ICF. The higher the ground inclination, the greater the error contributed, but error detection can be easier. Conversely, on flat ground errors are harder to detect but matter less. Because there can be inaccuracies intrinsic to the ICF determination process, an ICF value is prone to error. Accordingly, an ICF can be run through a filter for multiple angles of inclination experienced by the vehicle 105 until a determination can be made that an inaccuracy in the expected ICF exists. The EDM 222 can provide a revised expected ICF value as an output, or provide a value representing the difference between observed and expected ICF's.

The HDM 226 can be configured to use the EDM 222 output to determine a proposed antenna height. For example, the HDM 226 can perform trigonometric operations using an observed ICF and the inclination angle at which the ICF was observed. Using the proposed antenna height, the HDM 226 can be configured to determine a proposed tire radius for a vehicle tire. For example, a proposed antenna height and a vehicle body height $h_{vb}$ representing the height of the vehicle body extending from an axle to the top of the vehicle, can be used to provide a proposed tire radius value.

The HDM 226 can be embodied as a stand-alone special purpose processor, or as software, hardware, firmware or some combination thereof. In an example embodiment, the HDM 226 can be embodied as a software module executed on a general purpose processor or computing device resident on the vehicle 105. For example, the HDM 226 can be in the form of software executed on the controller 210. In an example embodiment, the HDM 226 can be configured as software instructions encoded on a computer readable medium.

The AIM 220 can include a storage device (SD) 226. The SD 226 can be in the form of a memory, database, or other device in which data and/or records can be stored and from which data can be subsequently retrieved. The SD 226 can be configured to store satellite-based position data, ICF values, both expected and observed, and detected inclination angles. The SD 226 can also be configured to store a predetermined vehicle height, and a table of standard tire heights or standard tire radii. In addition, height values determined by the HDM 224 can be recorded to the SD 226.

An example system can include the controller 210 for controlling and enabling various operations of the VNS 200. It is contemplated that the controller 210 can comprise a microprocessor or other processing/computing means, either as a dedicated or shared device. In an example embodiment, system elements that comprise software can be executed at the processor 210. The processor 210 can be configured to interface with the receiver 202, the sensor 204, the guidance system 206, and the AIM 208.

FIG. 3 depicts an example 300. As shown in the figure, vehicle 305 is on terrain 310 that is sloped with an angle θ with respect to the horizontal. The sloped terrain causes the vehicle to be oriented at an inclination angle, in this case a roll angle θ. A satellite antenna 315 is deployed atop the vehicle 305 and coupled to a VNS 320. Using techniques known in the art, a satellite-based position, represented in FIG. 3 by point SB ($x_{SB}$, $y_{SB}$), can be provided by a VNS 320 receiver coupled to the antenna 315. However, point B does not lie within the path presently covered by the vehicle 305. Point A ($x_A$, $y_A$), projected from the antenna 315 down along a vertical vehicle axis, lies within the present path covered by the vehicle 305 and more accurately represents the antenna and vehicle ground position. Modern guidance systems incorporate inertial sensors that can detect various angles of inclination of a vehicle, including tilt, roll and pitch, to allow mathematical calculation of the ICFs to obtain the position represented by point A. By way of example, the VNS 320 can include one or more sensors 204.

Typically, inclination angles and height are used to calculate an ICF. For example, referring to FIG. 3, the ICF, i.e. the difference between satellite-based point B and the adjusted point A, namely the ICF, along the x-axis shown can be obtained by the equation below:

$$ICF_x = h \sin \theta \quad \text{(Eqn. 1)}$$

where $\theta$ represents the roll angle of the vehicle, and
h represents the height of the antenna above ground.

As discussed previously herein, h is typically represented by a predetermined vehicle height $h_v$ that is commonly stored at a guidance system during the manufacturing process. With an x,y,z-coordinate system as shown in FIG. 3, the x-coordinate of the point A can be found from:

$$x_A = x_{SB} - ICF_x \quad \text{(Eqn. 2).}$$

The y-component of the ICF can be found from $$ICF_y = ICF_x \tan \theta \quad \text{(Eqn. 3)}$$

and the y-coordinate of point A can be found from $$y_A = y_{SB} + ICF_y \quad \text{(Eqn. 4).}$$

It is noted that an ICF can be defined and expressed in terms of various axes and coordinate systems. In addition, a vehicle's orientation can be expressed by more than one inclination angle, for example a vehicle can have a pitch and tilt angle in addition to a roll angle. Accordingly, an adjusted position can reflect ICFs along a plurality of axes. In addition, it is contemplated that, depending on a particular application or required output, an ICF along a first axis may be considered, while an ICF along a second axis may be considered irrelevant. Referring to FIG. 3, it is possible that an ICF determination process may include calculation of $ICF_x$, but not $ICF_y$. For illustrative purposes, the discussion herein will focus on the ICF component along an x-axis caused by a roll angle $\theta$.

As mentioned previously herein, because satellite antennas are relatively short and are typically deployed atop a vehicle for optimal signal reception, vehicle height is often used as antenna height for ICF calculation purposes. In most cases, a predetermined vehicle height value, $h_v$, is stored during guidance system or vehicle manufacture. However, if the vehicle height $h_v$ does not accurately represent the antenna height, as shown in FIG. 3, errors in ICF can ensue. As an example, $h_v$ can differ from the actual antenna height due to the tires 312, that can have a tire height $h_t$ and radius $r_t$. Variations in vehicle tire radius, whether due to size or inflation, can alter height by as much as 20 cm. While this change in height may not be significant at relatively small inclination angles, the height difference can have noticeable effects at larger angles. For example, referring to FIG. 3, and assuming the ICF is expressed simply in terms of its x component, at a roll angle of 10°, a vehicle height of 350 cm will produce an $ICF_x$ of 60.8 cm. For the same roll angle, using a vehicle height of 360 cm in Eqn 1 will produce an $ICF_x$ of 62.5 cm. In this case, a 10 cm difference in vehicle height value produces a difference of 1.7 cm in the $ICF_x$, which may be considered insignificant in most cases. However, for a greater roll angle, for example a roll angle of 20°, the 10 cm difference in vehicle height value can result in a 3.4 cm difference in $ICF_x$. Increased differences in height can produce increased differences in the $ICF_x$. For example, a 20 cm difference in vehicle height value can produce a 6.8 cm difference in the $ICF_x$ when the vehicle is at a 20° inclination angle. These differences can prove to be significant in Real Time Kinematic (RTK) applications accurate to the centimeter level executed by on-board guidance systems.

Unfortunately, most guidance systems fail to verify actual vehicle or antenna height, so errors in height can continue undetected and uncorrected. Furthermore, most guidance systems lack an interface to allow an operator to alter the vehicle height value or enter an antenna height to obtain a more accurate ICF calculation. As a result, the positions or track recorded at a vehicle guidance system can fail to represent the actual path covered, impairing guidance system performance and decreasing operational efficiency. In the example 300, the VNS 320 can be configured to avoid such errors, having an AIM that can detect height inaccuracies and provide more accurate height values.

Figure 4:
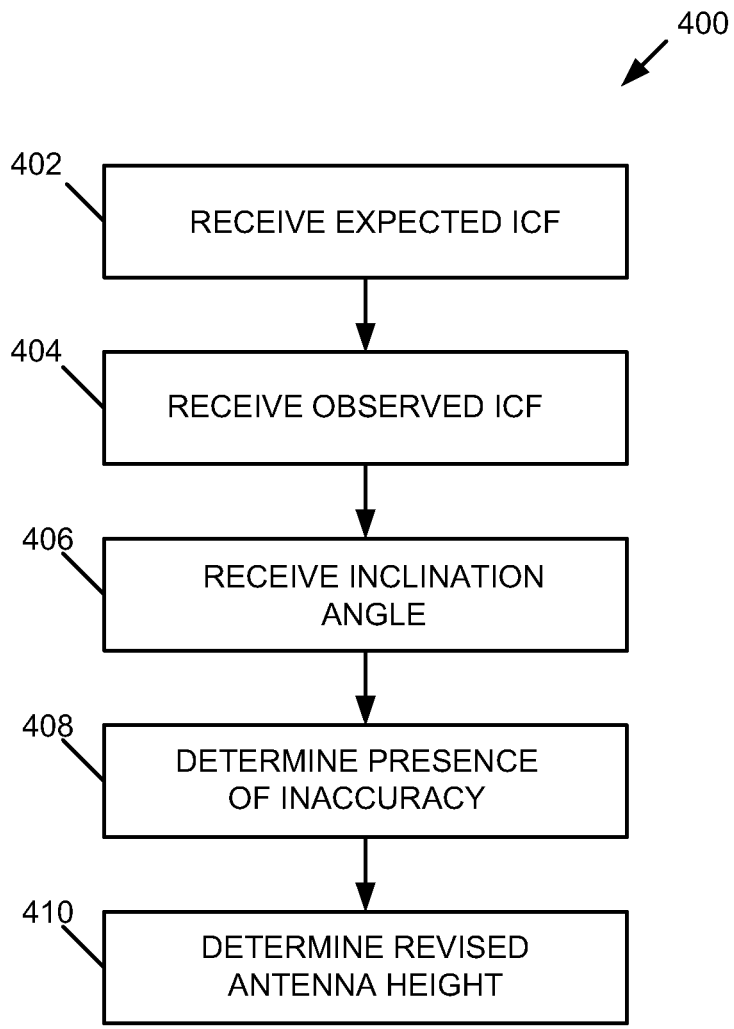
FIG. 4 depicts an example method of the invention for improving guidance system performance.

FIG. 4 shows an example method 400 that can improve guidance system performance. At block 402, an AIM can receive one or more expected ICFs. For example, the guidance module 206 can provide to the AIM 208 an expected ICF based on a predetermined vehicle height $h_v$ stored at the guidance module 206, and an inclination angle detected by sensor 204. At block 404, an AIM can receive a measured ICF. For example, receiver 202 can provide a measured or observed ICF associated with a particular inclination angle detected by sensor 204. It is contemplated that in a further example embodiment, a difference between an expected and observed ICF can be provided to the AIM 208 by the receiver 202.

At block 406, an inclination angle can be received. For example, the roll angle $\theta$ for the vehicle 305 can be detected by the sensor 204 and provided to the AIM 208. By way of example but not limitation, the roll angle can be provided directly to the EDM 222, the HDM 224 or to the SD 224 for storage and subsequent retrieval. It is contemplated that inclination angles other than roll angle may be detected, stored and retrieved, such as tilt and/or pitch angles. At block 408, a determination can be made as to whether there is an inaccuracy in an expected ICF for a detected inclination angle. For example, a plurality of observed ICF's associated with a plurality of various inclination angles can be compared to the expected ICF for the various inclination angles. The inaccuracy determination process can further include running observed ICFs through a filter for various angles of inclination in order to detect the presence of an inaccuracy.

In response to a determination that an inaccuracy is present, a revised antenna height can be determined at block 410. As discussed previously herein, inaccuracies in ICF can be caused by inaccurate antenna height values. For example, a vehicle with newly installed tires, or over/under-inflated tires may have an overall vehicle height that differs from the predetermined vehicle height $h_v$. In an exemplary embodiment, a revised antenna height can be provided to the GPM 206 to be used in future ground position calculations.

Figure 5:
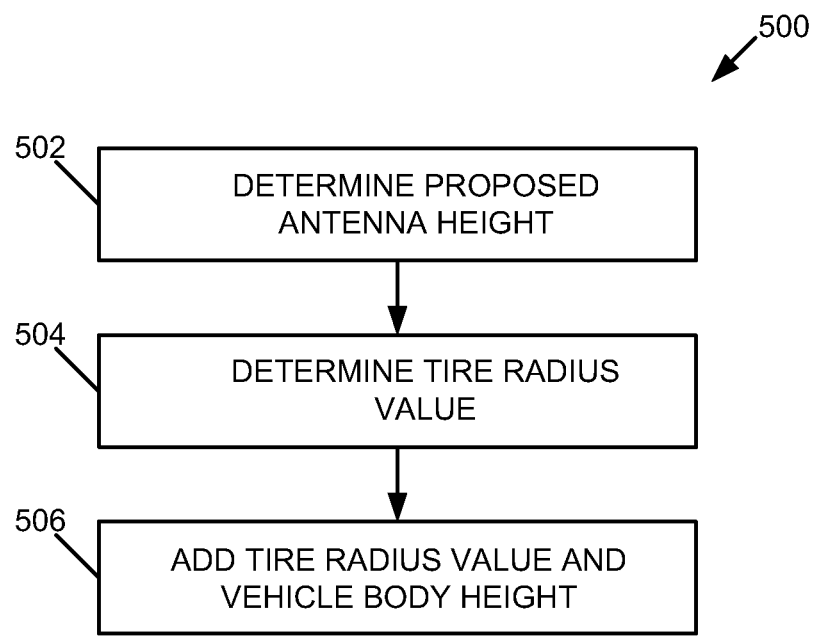
FIG. 5 depicts an example method of the invention for determining a revised antenna height.

FIG. 5 depicts a flow diagram of an example method 500 for determining a revised antenna height. At block 502, a proposed antenna height can be determined. In an exemplary embodiment, an ICF provided by the EDM 222 and associated with a particular inclination angle can be used to determine a proposed antenna height. Referring to FIG. 3, it can be seen from the Eqn 1 above that a proposed antenna height $h_p$ can be found using $ICF_x$, and the sine of the roll angle $\theta$. In particular, $h_p$ can be found from the following:

$$h_p = ICF_x / \sin \theta \quad \text{(Eqn. 5)}$$

where $ICF_x$ is provided by the EDM 222, and $\theta$ is the roll angle associated with the $ICF_x$.

Figure 6A:
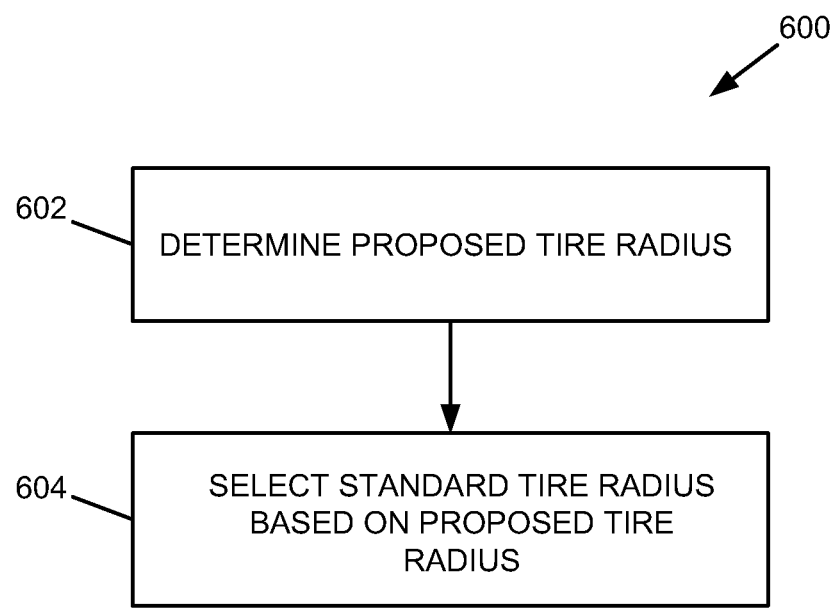
FIG. 6A depicts an example method of the invention for determining a tire radius value.

In an exemplary embodiment, the HDM 224 determines the proposed antenna height $h_p$. An example method may include calculating a plurality of proposed antenna heights using a plurality of ICFs at various inclination angles to determine a proposed antenna height value $h_p$. At block 504 a tire radius value can be determined. FIG. 6A shows a method 600 for determining a tire radius value. At block 602, a proposed tire radius can be determined from a proposed antenna height. For example, the distance between the ground and the axle, which can be attributed to the vehicle's tire radius can be found by subtracting the length of the vehicle body from the proposed antenna height. Thus, the radius of a vehicle tire can be expressed as below:

$$r_{tp}=h_p-h_{vb} \quad \text{(Eqn. 6)}$$

In an exemplary embodiment, the HDM 224 can determine the proposed tire radius. At block 604 a standard tire radius value can be selected based on the proposed tire radius. For example, the proposed tire radius can be compared to a table of standard tire stored at the SD 226. A predetermined selection scheme can be used to select a standard tire radius based on the proposed tire radius. By way of example, the standard tire radius closest to the proposed tire radius can be selected and used as a tire radius value.

Figure 6B:
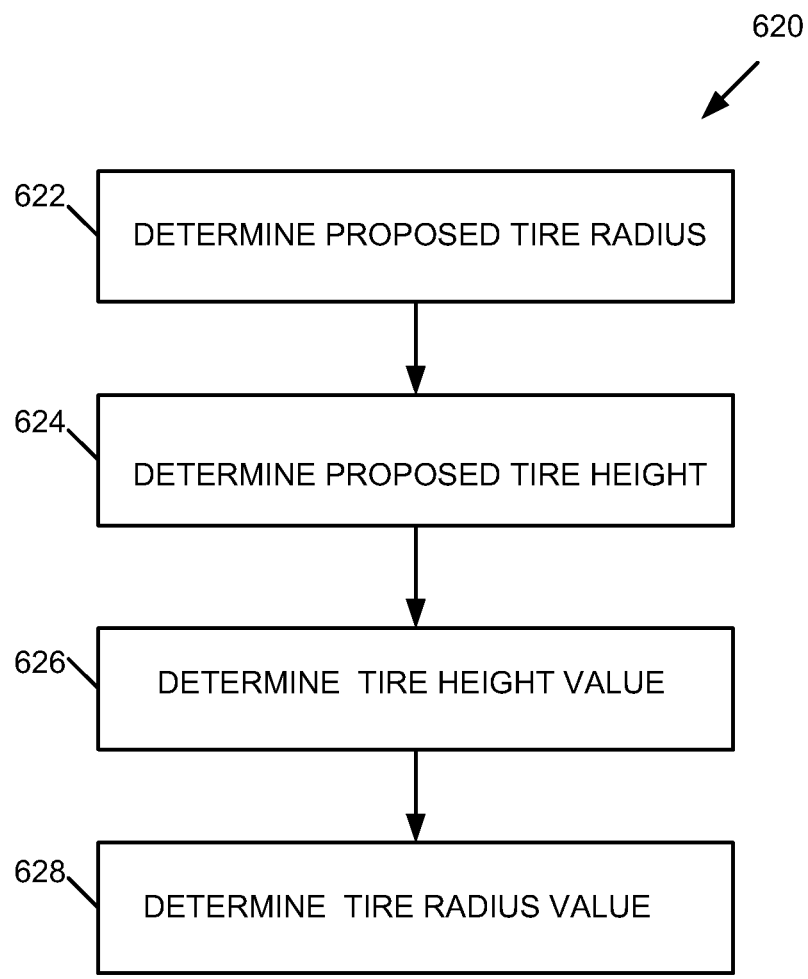
FIG. 6B depicts an example method of the invention for determining a tire radius value.

FIG. 6B shows a method 620 for determining a tire radius value. At block 622 a proposed tire radius is determined from a proposed antenna height. As stated above, a vehicle body height $h_{vb}$ can be subtracted from a proposed antenna height to provide a proposed tire radius. At block 624 a proposed tire height can be determined. For example, the proposed tire radius found at block 622 can be doubled to provide a proposed tire height. At block 626 a tire height value can be determined. In an example embodiment, a standard tire height is selected based on the proposed tire height. For example, the proposed tire height can be compared to a table of standard tire heights stored at the SD 226. A predetermined selection scheme can be used to select a standard tire height based on the proposed tire height. By way of example, the standard tire height closest to the proposed tire height can be selected and used as a tire height value. At block 628, a tire radius value can be determined from the tire height value. For example, the tire height value can be halved to provide a tire radius value.

Referring back to FIG. 5, at block 506 a revised antenna height can be determined using the tire radius value and the vehicle body height $h_{vb}$. The tire radius value $r_t$ can be added to the vehicle body height $h_{vb}$ to provide a revised antenna height, $h_{ar}$, that more accurately represents the height of the antenna above ground:

$$h_{ar}=h_v+r_t \quad \text{(Eqn. 10)}.$$

The value $h_{ar}$ can be stored at the SD 224, and can also be provided to the GPM 206. Using the revised antenna height $h_{ar}$ rather than the predetermined vehicle height $h_v$, a revised expected ICF can be determined and used by the GPM 206 in the determination of an adjusted position that better represents that actual path traveled by the vehicle 305. A method can further include informing a user that an incorrect value was detected and is being corrected. For example, a diagnostics message can be displayed to a user at a user interface screen on a display device coupled to a guidance system or the system 200.

Thus the present invention provides a system, method and apparatus for determining the height of an antenna deployed atop an agricultural vehicle. Improving the accuracy of the antenna height can improve ICF calculations so that a guidance system can have a more accurate record of the paths actually traversed by a vehicle. An exemplary method uses satellite data and inclination angle to provide a proposed antenna height from which a proposed tire height and/or a proposed tire radius can be determined. The proposed tire height (radius) can be compared to a table of standard tire heights (radii) from which a tire height (radius) value can be determined. A revised antenna height can be determined by adding the vehicle body height to a tire radius value. The revised antenna height can be used to determine an ICF at a detected inclination angle, which in turn can be used in determining an adjusted position for a vehicle on a sloped terrain.

The invention can be practiced using an AIM and standard onboard satellite receivers and inertial sensors, without need of additional measuring or detection equipment such as a laser or multiple antennas. Systems and methods of the invention can confirm the integrity of the onboard inertial sensors. For example, if an inertial sensor indicates the vehicle is on a slope, but the ICF analysis does not support that conclusion, a sensor fault can be indicated.

While the invention has been disclosed in its preferred forms, it will be apparent to those skilled in the art that many modifications, additions, and deletions can be made therein without departing from the spirit and scope of the invention and its equivalents, as set forth in the following claims.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A system comprising:
  a receiver for receiving satellite transmissions;
  an inertial sensor for detecting an inclination angle of a vehicle on which said receiver is deployed; and
  an accuracy improvement module (AIM) for detecting an inaccuracy in a predetermined antenna height used to determine an inclination compensation factor (ICF) associated with said inclination angle, said AIM configured to calculate a revised antenna height, and store said revised antenna height for subsequent use in determining the ICF, wherein said AIM is configured to determine a proposed antenna height using said inclination angle and an observed ICF, and wherein said AIM is configured to subtract a fixed vehicle body height from said proposed antenna height to provide a proposed tire radius.

2. A method comprising:
  receiving an observed inclination compensation factor (ICF) for an antenna atop a vehicle oriented at an inclination angle, wherein said ICF is calculated using a predetermined antenna height;
  comparing said observed ICF to an expected ICF for said antenna at said inclination angle;
  in response to detecting an inaccuracy in said expected ICF, determining a revised antenna height using said observed ICF and said inclination angle; and
  storing said revised antenna height so the revised antenna height is used in a future ICF calculation instead of said predetermined antenna height, wherein said determining a revised antenna height comprises determining a proposed antenna height using said observed ICF and said inclination angle.wherein said determining said revised antenna height comprises subtracting a vehicle body height from said proposed antenna height to provide a proposed tire radius.

3. The method of claim 2, further comprising providing said revised antenna height to a ground position module configured to determine said expected ICF for said inclination angle.

4. The method of claim 2, wherein said determining a revised antenna height comprises comparing said proposed tire radius to a table of standard tire radii to determine a tire radius value.

5. The method of claim 4, wherein said determining a revised antenna height comprises adding said tire radius value to said vehicle body height.

* * * * *